June 7, 1927.
H. J. ENGLAND
1,631,929
LEVER CONTROL FOR CLUTCH PEDALS
Filed Oct. 16, 1926
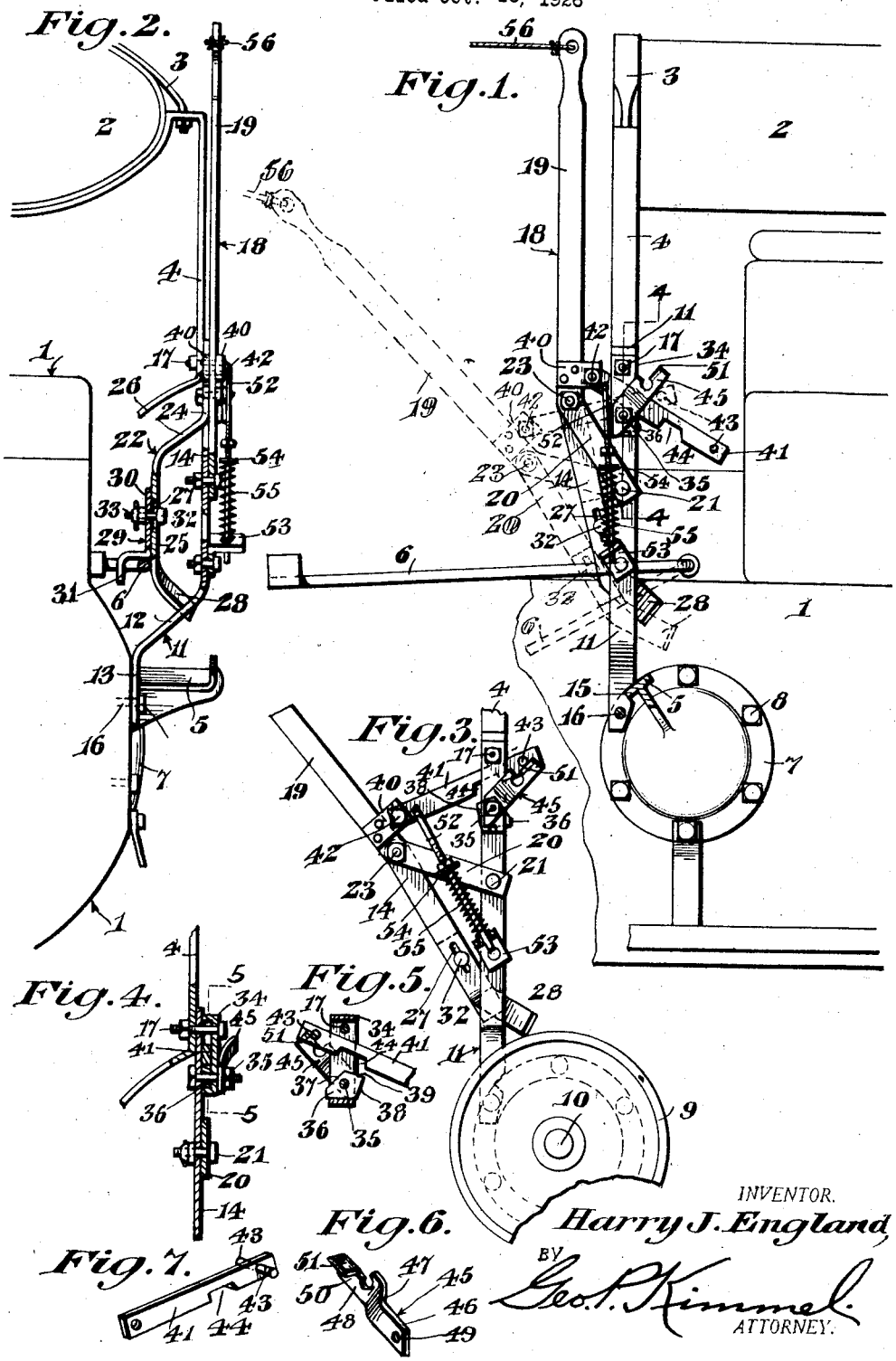
INVENTOR.
Harry J. England,
BY
Geo. P. Kimmel.
ATTORNEY.

Patented June 7, 1927.

1,631,929

UNITED STATES PATENT OFFICE.

HARRY J. ENGLAND, OF IOWA FALLS, IOWA.

LEVER CONTROL FOR CLUTCH PEDALS.

Application filed October 16, 1926. Serial No. 142,069.

This invention relates to a lever control for clutch pedals, and designed primarily for use in connection with the well known Fordson tractors, but it is to be understood that a lever control, in accordance with this invention can be employed for any purpose for which it is found applicable, and the invention has for its object, to provide, in a manner as hereinafter set forth for readily releasing and locking a clutch with but a slight amount of effort on the part of the operator.

A further object of the invention is to provide, in a manner as hereinafter set forth, a clutch locking and releasing means so positioned with respect to a tractor to permit of the operation thereof without the necessity of leaving the seat of the tractor, as well as permitting of its operation from a point rearwardly of the tractor or from the sides of the latter when the operator is not riding on the tractor.

A further object of the invention is to provide, in a manner as hereinafter set forth, a lever control for clutch pedals so constructed and arranged to permit, after the clutch pedal has been locked by such control, the operator if he desires to release the clutch pedal without actuating the lever control.

A further object of the invention is to provide, in a manner as hereinafter set forth, a lever control for clutch pedals adapted for use in connection with a tractor whether the latter is employed for pulling a ground working device, or when the tractor is used as a driving means for any type of machine capable of being driven from a tractor.

Further objects of the invention are to provide, in a manner as hereinafter set forth, a lever control for clutch pedals which is simple in its construction and arrangement, strong, durable, thoroughly efficient in its use, conveniently actuated for releasing and locking the clutch of a tractor, readily installed with respect to the latter without changing the construction thereof, and comparatively inexpensive to manufacture.

With the foregoing and other objects in view, the invention consists of the novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a lever control, in accordance with this invention, showing the adaptation thereof with respect to a Fordson tractor and further illustrating in full lines a lever control in clutch pedal released position and in dotted lines in clutch pedal locked position.

Figure 2 is a rear elevation partly in section of a lever control in accordance with this invention, showing the adaptation thereof in connection with a tractor and with the lever control in clutch pedal locked position.

Figure 3 is a fragmentary view, in side elevation of a lever control, in accordance with this invention, and with the control in releasing position and further showing the adaptation thereof in connection with a drive pulley.

Figure 4 is a section on line 4—4 Figure 1.

Figure 5 is a section on line 5—5 Figure 4.

Figure 6 is a perspective view of a latch member guide.

Figure 7 is a perspective view of a latching member.

Referring to the drawings in detail 1 generally indicates a tractor of the Fordson type and which includes a lengthwise disposed fuel tank 2, mounted in a support 3, provided with a depending frame piece 4. The tractor further includes a foot rest or bracket 5, a clutch lever 6, a closure cap 7 with which the foot rest or bracket 5 is integral. The cap 7 is secured to the body of the tractor by holdfast devices 8, and when said cap 7 is removed, a pulley 9 can be connected to a shaft 10 driven from the tractor. The foregoing elements are of known construction, no claim is made thereto and are illustrated for the purpose of showing the adaptation with the tractor of a lever control in accordance with this invention.

A lever control, in accordance with this invention, includes an upstanding support referred to generally by the reference character 11 and consisting of an intermediate portion 12, a lower end portion 13 and an upper end portion 14 which is of materially greater length than the lower end portion 13. The intermediate portion 12 extends outwardly and upwardly at an inclination whereby the end portions 13 and 14 will be disposed in parallel planes. The lower end of the intermediate portion 12 merges into the upper end of the lower end portion 13, and the upper end of the intermediate portion 12 merges into the lower end of the upper end portion 14. The lower end portion 13 is notched as at 15 for the purpose of overlapping the foot bracket 5 when the cap 7 is secured to the tractor body. The lower end portion 13 is secured in position by the hold fast device 16. When the cap 7 is removed the lower end portion 13 is fixedly secured directly to the tractor body. The upper end portion 14, of the upstanding support 11, is fixedly secured to the frame piece 4 by the hold fast device 17. The lower end portion 13 is positioned below the clutch pedal or lever 6, and the intermediate portion 12 is also positioned below the clutch lever or pedal 6 and projects outwardly with respect thereto.

A hand lever forms an element of the lever control and said hand lever provides means for actuating the lever control for the purpose of locking and releasing the clutch lever or pedal 6. The hand lever is referred to generally by the reference character 18 and is positioned rearwardly with respect to the support 11. The hand lever 18 includes a vertically disposed portion 19 and an angularly disposed portion 20, which projects downwardly at a forward inclination with respect to the lower end of the portion 19. The portion 19 is of materially greater length than the portion 20, and the latter is pivoted as at 21 to the upper end portion 14 of the support 11. The pivot 21 is arranged at the lower end of the portion 20 of the hand lever 18, and is also positioned intermediate the ends of the upper end portion 14 of the support 11. The lower end of the portion 20 of the hand lever 18 is arranged against the outer side of the upper end portion 14 of the support 11.

Freely pivoted to the hand lever 18, at the point of joinder of the portions 19 and 20 thereof, is a depending hanger referred to generally by the reference character 22. The hanger 22 is positioned inwardly of the hand lever 18 and has its upper end pivoted, as indicated at 23, and as before stated the pivot is at the point of joinder of the portions 19 and 20 of the hand lever 18. The hanger 22 also extends inwardly with respect to the support 11. The hanger 22 includes an upper and a lower vertically extending portion 24, 25 respectively. The portion 25 is of greater length than the portion 24 and disposed rearwardly with respect thereto. The portion 25 merges into an outwardly extending and upwardly inclined portion 26 which merges into the lower end of the portion 24. The portion 24 is pivoted to the hand lever 18 as at 23. The portion 25 intermediate its ends is provided with a lengthwise extending slot 27. The portion 25 terminates in a depending forwardly inclined curved portion 28, which permanently rides against the forward edge of the intermediate portion 12 of the support 11, and said intermediate portion 12 provides a guide for the portion 28 of the hanger 22. The portion 28 of the hanger 22 is disposed at the lower end of the latter.

The hanger has adjustably connected therewith a holding member for the clutch lever or pedal 6. The holding member provides means for maintaining the clutch lever or pedal 6 in lowered position whereby the clutch will be locked. The holding member is referred to generally by the reference character 29 and it consists of an upper part 30 and a lower part 31. The upper part 30 is positioned against the portion 25 of the hanger 22 and is disposed lengthwise with respect to said portion 25. The part 31 is angle shape in contour and seats upon and overlaps the clutch pedal or lever 6, when the holding member functions to lock said lever or pedal 6, see Figure 2. The holding member 29 is adjustably connected to the portion 25 of the hanger 22, and for such purpose a headed bolt 32 and a nut 33 are provided. The bolt 32 extends through the slot 27 and the part 30 of the member 29 and the nut 33 is mounted on the bolt 32 inwardly with respect to the part 30 of the member 29. The slot 27 permits of adjustably positioning the bolt 32, whereby the holding member 29 can be adjusted lengthwise with respect to the portion 25 of the hanger 22. The hanger 22 provides a carrier for the holder member 29 and the movement of the hanger 22 is guided by the intermediate portion 12 of the support 11. The hanger 22 is shifted in both directions when the hand lever 18 is moved to and from full line position shown in Fig. 1.

Secured to the outer side face of the portion 14 of the support 11 at the upper end thereof, is a yoke-shaped member 34 which provides a means for slidably connecting the latching member, to be presently referred to, to the support 11. The yoke-shaped member 34 is secured to the support 11, by the hold fast device 17 which is employed for securing the upper end of the support 11 to the frame piece 4. The member 34 is additionally secured to the upper end of the support 11 by the hold fast device 35. Seated upon the bottom of the member 34, as well as arranged within the latter and positioned against the outer side of the support 11, is a locking block 36 which projects from each side edge of the member 34. The inner side edge of the block 36 has the upper part thereof inclining upwardly and forwardly as at 37, the outer side edge of the block 37 inclines upwardly and forwardly as at 38, and the top edge of the block 36 inclines downwardly and forwardly as at 39. The inclination of the part 37 is greater than the inclination of the edge 38 whereby the block 36 is of tapered contour. The block 36 is of materially less height than the height of the member 34 and is fixedly secured in position by the hold fast device 35. Secured to the portion 19, of the hand lever 18, in proximity to the point of joinder of the portion 19 with the portion 20 of said lever 18, is a pair of laterally extending apertured ears 40, having the rear end of a latching member 41 pivotally connected therewith. The pivot between the latching member 41 and ears 40 is indicated at 42.

The locking member 41 is constructed of a flat bar of appropriate width and length and is slidably connected with the support 11 by the member 34. The latching member 41 extends through the member 34 and has its forward end formed with a laterally extending pin 43 which extends from both side faces of the member 41. The rear end of the latching member 41 is connected with the ears 40 by the pivot 42. The lower edge of the latching member 41, at a point between the transverse median of the latter and the pin 42, is formed with a notch 44, which corresponds in contour to the upper portion of the locking block 36, and said notch 44 is adapted to receive the block 36 for the purpose of latching the lever control in position, to lock the clutch lever or pedal 6 from upward movement whereby the clutch, not shown, with which the lever pedal 6 is associated, is held in locked position. The pin 43 also acts as a stop for limiting the rearward movement of the latching member 41, due to the fact that the pin 43 projects from each side of the member 41, and on the rearward movement thereof, the inwardly projecting portion of the pin 43 abuts against the support 11. The outer portion of the pin 43, that is to say the outwardly projecting part thereof acts as a means for guiding the member 41 to receive the locking or latching block 36. The outer portion of the pin 43 coacts with a combined guide and deflecting element referred to generally by the reference character 45 and which is secured against the outer side of the member 34. The element 45 is disposed at an upward and forward inclination and includes a lower portion or part 46, an intermediate part 47, and an upper part 48. The part 46 is provided with an opening 49 through which extends the hold fast device 35 for the purpose of fixedly securing the element 45 in position. The element 45 projects forwardly with respect to the member 34 and the intermediate part of said member 45 is inclined outwardly, that is to say away from the member 34. The forward terminal part or portion of the part 48 which is indicated at 50 is of less width than the parts 46 and 47, and said part 48 is provided at its top with an inwardly extending, right angularly disposed directing piece 51 under which the outer portion of the pin 43, travels for the purpose of directing the latching member 41, to receive the locking or latching block 36, or in other words the directing piece 51 shifts the latching member 41 downwardly on its pivot, see Figure 5 for the purpose of latching it.

When the block 36 is in the notch 44, as the clutch pedal or lever has a tendency to move upward, the rear edge of the notch 44 will bind against the rear edge of the block 36 and prevent the release of the clutch. When the lever 18 is moved rearwardly, the hanger 22 is shifted downwardly whereby the holder 29, will engage the clutch lever or pedal 6, and depress the same and the latter will be retained in lowered position until the latching member 41 is shifted clear of the block 36.

Associated with the latching member 41 is a spring controlled means therefor, which only acts during the rearward shift of the lever 18. The said controlling means consists of a bar 52, which is pivotally connected at its upper end in the member 41, and has its lower end slidably extended through a keeper 53, which is fixedly secured to the outer side of the support 11. The keeper 53 is of angle shape and interposed therebetween and an adjustable abutment 54 carried by the rod 52 is a coiled spring 55. The rod 52 is threaded so that the abutment 54 can be adjusted to increase or decrease the tension of the spring 55. The spring 55 is what may be termed of the snapping type and acts to snap the lever 41 into engagement with the block 36 and further acts to snap the member 41 clear of the block 36.

The lever 18 is shifted rearwardly to provide for the depression of the clutch lever or pedal 6 for the purpose of locking the clutch, not shown, and said lever 18 is also shifted rearwardly, to release the clutch lever or pedal 6.

With reference to Figure 1, the dotted line showing illustrates the lever control when being shifted to latching position, or rather holding position with respect to the clutch lever or pedal 6, and full line showing in Figure 3 illustrates the lever control being shifted to release position. When the mechanism is in the full line position as shown in Figure 1, it is in released position, and the spring 55 performs no function, but when shifted to holding position, the latch member 41 travels in the dotted line position shown in Figure 1, and the spring 55 acts to provide for the member 41 to be snapped into engagement with the block 36, and the member 41 will be held in such position due to the normal tendency of the clutch lever or pedal 6 to elevate owing to the controlling spring therefor not shown. When the lever control is shifted to the position shown in Figure 3 and to normal position shown in Figure 1, the lug 43 rides on top of the piece 51 of the element 45 and clears the same and the latching member 41 falls to the position shown in Figure 1.

Connected to the upper end of the lever 18 is a pulling member 56, to permit of the lever control to be operated exteriorly of the tractor. If the operator is riding on the tractor, and it is desired to release the clutch lever or pedal 6, independently of the lever control, a depression of the lever 6 will provide for the release thereof, and whereas on a depression of said lever 6, the snap spring 55 will be released and provide for the member 41 to quickly clear the locking or latching block 36.

It is thought the many advantages of a lever control for a clutch lever or pedal, in accordance with this invention, can be readily understood, and although the preferred embodiment of the invention as illustrated and described, yet it is to be understood that changes in the details of construction can be had which will fall within the scope of the invention as claimed.

What I claim is:

1. A lever control for clutch levers or pedals comprising a support, an operating lever pivotally connected therewith, a hanger depending from and pivotally connected at its upper end to said lever, a holding member carried by the hanger and adapted to be arranged in the path of the clutch lever or pedal for shifting the latter downwardly to locked position when the lever is moved in one direction, a latching block carried by the support, a latching member pivotally connected to the lever and coacting with said block for maintaining the clutch pedal in latched position, and a resilient device slidably connected with the support and pivotally connected to said member for snapping it into engagement with said block and for releasing it from engagement with said block during the shifting of said lever.

2. A lever control in accordance with claim 1, a combined guide and directing element connected with the support and coacting with said latching member.

3. A lever control for clutch levers or pedals comprising a support, shiftable means arranged in the path of the clutch lever or pedal for shifting it downwardly to and for holding it in latched position, a lever pivoted to said support and carrying said means for bodily shifting it, a latching means including coacting stationary and shiftable members, said stationary member carried by said support, said shiftable member pivotally connected to the lever, and means to provide for the snapping of said shiftable member in latching engagement with respect to said stationary member and for shifting said shiftable member clear of said stationary member on the actuation of said lever.

4. A lever control in accordance with claim 3, a combined guide and directing element coacting with said shiftable member.

5. A lever control in accordance with claim 1, a combined guard and directing element connected with the support and coacting with said latching member, means for slidably connecting said latching member to said support, and said element connected against and arranged exteriorly of said means.

6. A lever control in accordance with claim 3, a combined guide and directing element coacting with said shiftable member, and said support provided with an inclined portion to constitute a guide for said means carried by said lever.

7. A lever control in accordance with claim 3, a combined guide and directing element coacting with said shiftable member, means for slidably connecting said shiftable member to said support, and said support provided with an inclined portion to constitute a guide for said means carried by said lever.

In testimony whereof, I affix my signature hereto.

HARRY J. ENGLAND.